F. B. POWERS.
SILENT TYPE WRITING MECHANISM.
APPLICATION FILED APR. 26, 1913.

1,234,086.

Patented July 17, 1917.
5 SHEETS—SHEET 1.

Fig.1.

WITNESSES:
H. E. Hartwell.
Sebastian Hinton.

INVENTOR.
Frank B. Powers.
BY Chapin & Co
ATTORNEYS.

F. B. POWERS.
SILENT TYPE WRITING MECHANISM.
APPLICATION FILED APR. 26, 1913.

1,234,086.

Patented July 17, 1917.
5 SHEETS—SHEET 2.

WITNESSES:
H.C. Hartwell.
Sebastian Hinton

INVENTOR.
Frank B. Powers.
BY Chapin & Co
ATTORNEYS.

F. B. POWERS.
SILENT TYPE WRITING MECHANISM.
APPLICATION FILED APR. 26, 1913.

1,234,086.

Patented July 17, 1917.
5 SHEETS—SHEET 4.

WITNESSES:
H. C. Hartwell.
Sebastian Hinton

INVENTOR.
Frank B. Powers.
BY Chapin & Co
ATTORNEYS.

UNITED STATES PATENT OFFICE.

FRANK B. POWERS, OF SPRINGFIELD, MASSACHUSETTS.

SILENT TYPE-WRITING MECHANISM.

1,234,086.   Specification of Letters Patent.   Patented July 17, 1917.

Application filed April 26, 1913. Serial No. 763,746.

*To all whom it may concern:*

Be it known that I, FRANK B. POWERS, a citizen of the United States of America, residing at Springfield, in the county of Hampden and State of Massachusetts, have invented new and useful Improvements in Silent Type-Writing Mechanism, of which the following is a specification.

This invention relates to an apparatus combined with a typewriter in such a way that the typewriter is rendered noiseless wherever used in connection with the apparatus. One of the essential features of the invention consists in a noise-deadening apparatus, in which apparatus a typewriter is placed and operated in a convenient manner, with the result that the noise from the typewriter is eliminated.

It is well known that many classes of machines or operating mechanisms, while working, create an amount of noise which is not only bothersome to those unaccustomed to the same, but cause a distinct loss of efficiency in those who are not consciously bothered because accustomed to such noise. This loss of efficiency is due to the known fact that a constant occurrence of noise from any source has a distinct action on the nervous system.

The object of this invention is to provide an apparatus for eliminating the noise of the typewriter. A further object of the invention is to combine such an apparatus with a typewriter in a way to render the operation of the latter easy and efficient. A further object of the invention is to provide such an apparatus which may accommodate a present commercial form of typewriter if desired. A further object of the invention is to provide an apparatus in connection with which a vacuum may be established to eliminate the noise of the typewriter contained in the apparatus. A further object of the invention is to provide an apparatus of the class mentioned which is generally efficient.

The invention comprises a noise-deadening apparatus so constructed and arranged that the typewriter which it contains will not make any sound which is audible to those in its immediate vicinity. As an example, the apparatus may comprise a casing having noise-deadening walls, and the casing may contain the commercial typewriter therein, together with any suitable means for operating the typewriter while it is inclosed in the casing. The apparatus may comprise a multiple-walled casing with the walls spaced apart by sound-deadening material, in which casing the typewriter is placed, together with devices for operating the typewriter from without the casing.

The invention is particularly applicable to that class of mechanisms, such as a typewriter or sound-producing mechanism, and devices which in operation make a noise incident to their function and which produce a tangible result or product. As a rule, a mechanism of this class requires an attendant in the immediate vicinity of the mechanism who frequently needs to have access to the mechanism to inspect its work, feed it material, or for other similar needs. With this in mind, applicant, in the preferred form of his invention, has provided a structure and casing providing an inclosing means, which will smother the noise in the immediate vicinity of such mechanisms while allowing a free operation thereof and which will permit an attendant to have ready access to the mechanism within the casing whenever desired; and in addition, means are provided to control the operation or allow the mechanism to be operated from outside the inclosing means. The preferred form of the invention will permit the attendant to see the operation of the mechanism from outside of and in the immediate vicinity of the chamber.

The objects above referred to can be attained by inclosing the sound-producing mechanism in a properly-constructed sound-deadening chamber. The control of the mechanism, while working, can be from outside of the chamber, as, for instance, by electrical control, pneumatic control, or direct mechanical control. It may be pointed out that the invention, broadly, may be carried out by applying devices for deadening sound, such as a double-walled casing, with a sound-deadening packing material between the walls, or by using two or more walls without the packing material, or a single wall of sound-deadening material of sufficient thickness, or a single or multiple wall inclosing a space or spaces in which a sufficient vacuum has been obtained. When a sound-producing mechanism can be placed in a chamber where a complete, or nearly complete, vacuum is possible and practicable, the chamber can be constructed of a single wall of suitable material, form and thickness to resist the outside pressure of the atmosphere, and in such a chamber the sound is completely eliminated. Where only a partial vacuum is possible or practicable and it is necessary or desirable to use comparatively thin walls, a sound-deadening chamber can be constructed of two or more walls, the walls not touching each other and with space between—held together and yet apart by a sound-deadening material. Such a chamber, made to open and close to allow access to the mechanism therein, should be so constructed that when it is closed pressure can be applied to hold the different sections tightly together, and for this purpose a vacuum inside the walls is preferable, as the pressure of the atmosphere is more evenly distributed than other pressure would be, at the same time that the vacuum itself inside the walls is a thinning of the air and therefore sound-deadening.

Applicant has found by various experiments that one of the preferred methods of carrying out his invention is by constructing a casing to contain a typewriter and by providing means for operating the typewriter when it is inclosed in the casing and then establishing a vacuum either in the casing or in multiple-walled surrounding spaces, or in both, the establishment of which vacuum will eliminate any noise that the typewriter ordinarily makes. This principle of eliminating the noise of a typewriter by means of a vacuum is important in carrying out the invention herein described. The particular application of this principle to the objects desired involves a preferred form of apparatus. Applicant has herein described his preferred form of specific apparatus with various features involved, all of which disclose the invention in a way to enable others skilled in the art to make and use the same. It is to be understood, however, that applicant well realizes that the general invention in eliminating typewriter sounds by means of a sound-deadening apparatus can be embodied in innumerable specific forms. and he is illustrating and describing the forms herein shown only as illustrative of preferred ways in which the invention can be conveniently carried out and not with any idea of limiting the invention, broadly, to the specific forms shown.

Referring to the drawings,—

Figure 1:
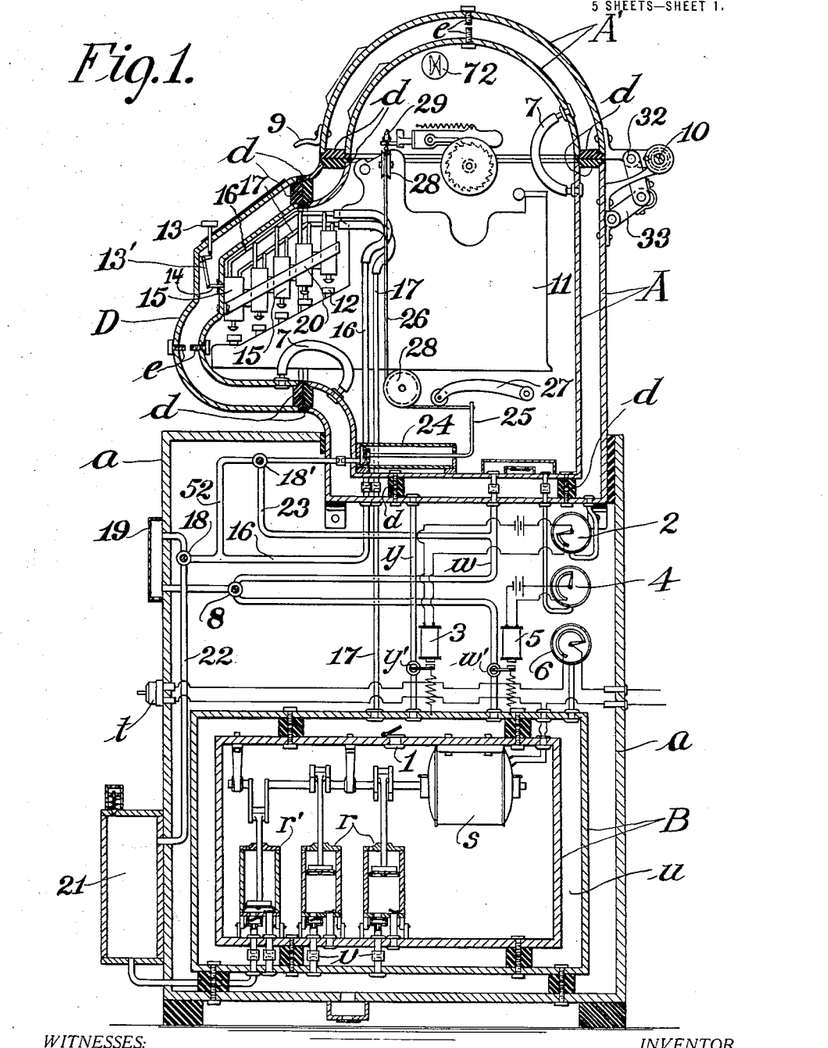
Figure 1 shows a sectional view in side elevation taken on line 1—1 of Fig. 2 of a complete apparatus in which the typewriter inserted in the apparatus is shown in outline only.

Referring to Fig. 1, the general arrangement of the apparatus in one of its preferred forms will be described. The apparatus comprises the main inclosing cabinet $a$ within which the greater part of the vacuum establishing and controlling mechanism is contained. Supported on and rising from the top of the cabinet $a$ is a double-walled containing casing A, A', and D which may be opened to provide access thereto at two points; first, at the portion of the casing A', and, second, at the portion D. The walls of casing A, as well as portions A' and D, are held apart in spaced relation by means of rubber pieces $d$ or other suitable non-sound-conveying material. It will be noticed that the abutting edges of the casing A and both portions A' and D are the rubber faces of pieces $d$ which make an effectual seal. Within the casing and supported by any suitable means, not shown, a typewriter 11 may be placed. The outline only of this typewriter is shown herein as it is obvious from the drawing just how a commercial typewriter may be placed in position.

Fastened to the inner wall of the casing of portion D, by means of a bracket 20, are a series of pneumatic operating devices 15, one for each key and one for the letter spacing bar of the typewriter. These pneumatic key-operating devices, being supported by and fastened to the bracket 20, will move with the portion D when the latter is swung outwardly in a manner to be described to provide access to the interior of the casing and to the typewriter keys therein. Connected to each pneumatic operating device, one only of which is shown, is a rod 14 which, by means of connecting levers, passes through the double-walled space of portion D to the exterior of the casing. Between the double walls, the key 13 ends with a section of rubber or other material to prevent any sound being transmitted along the rod and connections to the exterior of the casing. This rod is reciprocated by means of a key acting on a lever 13' pivoted to a bracket fastened to the front wall of the walls D. The operation of the key 13 will move a valve in the pneumatic key-operating device to be described. It will be understood that there is one key 13 for each of the pneumatic key-operating devices, and, thus, the keys 13 will correspond in number, arrangement, and broadly, in function to the keys 12 and the letter spacing bars of the typewriter proper.

When it is desired to get at the upper part of the typewriter, the portion A' is moved upwardly. The walls of this portion are connected to a swinging hinge rod pivoted at point 10, and a coiled spring on the pivot 10 normally acts to keep the portion A' elevated. When there is no vacuum established within the casing A, the spring just mentioned will cause the portion A' to swing quickly to its upper position, and, in so doing, the link members 33, connected at one end to the casing A and at the other end to the hinge rod, will straighten out and act as a silent stop; thus the portion A' will be quickly swung to its open position but without any noise being made in the operation. It will be noticed that the double-walled spaces between the walls of all portions of the casing are permanently connected together by flexible means 7 which may swing together with the portions A' or D without breaking the connection between the double-walled spaces. It is desired to establish and maintain within these double-walled spaces a vacuum of about ten inches of mercury.

At this point it may be noted that, with a vacuum of ten inches of mercury in the double-walled spaces of the casing and a degree of vacuum of twenty inches in the interior of the casing, both established in a manner to be described, there will be a pressure on both the outer and inner walls of portions A' and D acting to keep these portions closed. The pressure will not be excessive, however, on either wall, for the difference of pressure on opposite sides of any one wall will be about ten inches of mercury. The pressure by the arrangement described may be said to be stepped by degrees to avoid excessive pressures. When, however, there is a vacuum between the walls thereof and the interior of casing A has an atmospheric pressure, the pressure on both walls of portions A' and D acts to force these walls together. Since they are held in spaced apart relation by the rubber pieces d, which may yield somewhat under pressure, there is a movement of the walls toward one another. To prevent any excessive movement, the screws e are provided, the ends of which abut under the conditions named with atmospheric pressure on both walls of portions A' and D, but the screws e, when there is a higher vacuum in the interior of the casing than between the walls, are separated, as shown, to prevent noise being transmitted by the metal from the interior to the exterior of the casing.

Figure 2:
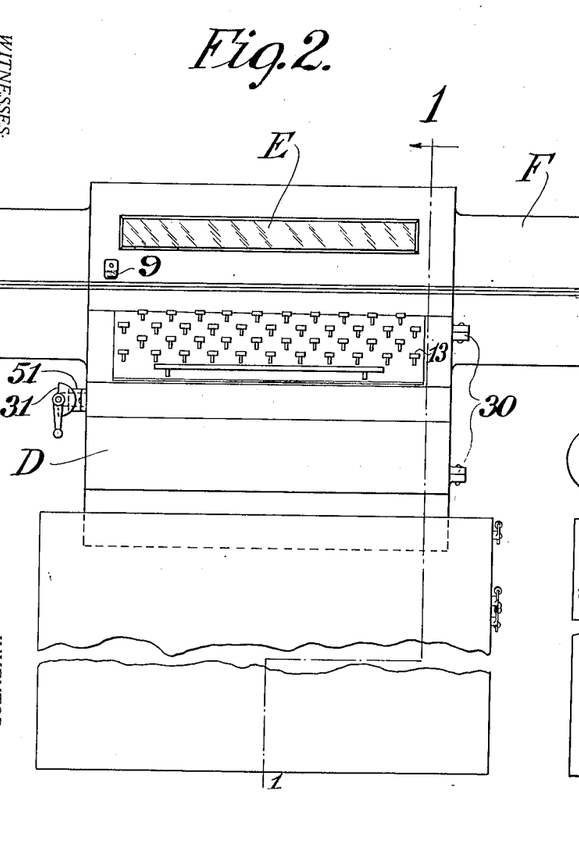
Fig. 2 is a front elevation of the typewriter containing casing with the supporting cabinet broken away to economize space.
Figure 3:
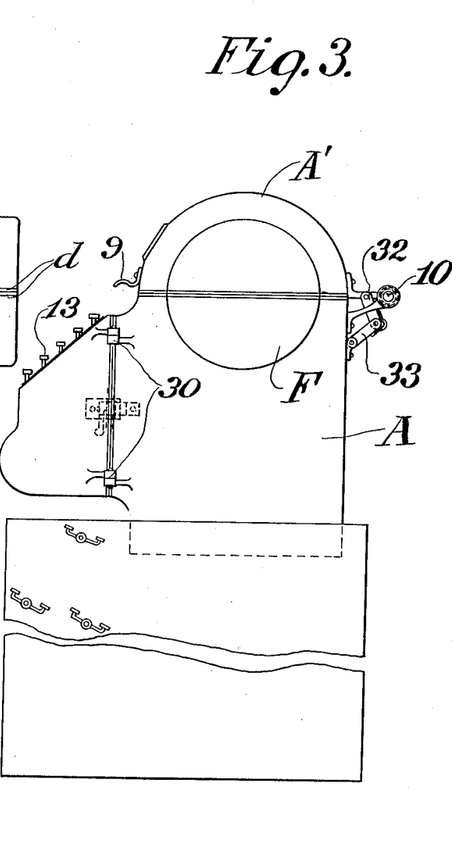
Fig. 3 is a side elevation of the same.

In the interior of the casing A, it is desired to have a vacuum of about twenty inches of mercury. This vacuum, being established in the interior of the casing, results in the atmospheric pressure holding the portions A' and D in closed position. When it is desired to reach the keys 12 of the typewriter, the vacuum in the interior of casing A is first broken and then the portion D is swung horizontally (see Fig. 2) on the pivots 30 and carries the pneumatic operating devices 15 away from the keys 12. As this part of the casing A is turned on the pivots 30, access is obtained to the interior of the casing and the keyboard of the typewriter. In order to lock this part D of the casing in closed position, the latch 31 (see Fig. 2) is provided. This latch 31 comprises a pivot-member threaded in a bracket extending from the main walls of the casing A. An angle-piece 51 fastened to the walls D is designed to be engaged by the latch 31 when turned into the position shown in Fig. 2 and forced thereby in a direction to close the walls D. The latch 31, being threaded in the bracket mentioned, passes over the bracket 51, and, as it is turned, it moves to wedge the piece 51 and the portion D into tightly closed and locked position.

Figure 4:
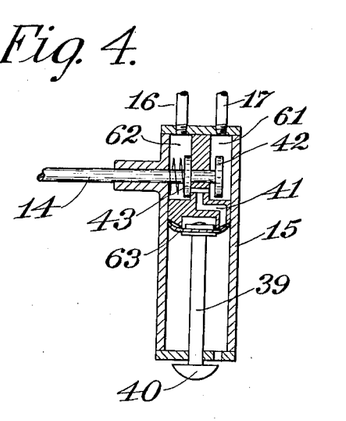
Fig. 4 is a detail view in section of the pneumatic means for operating the typewriter keys.

Assume that the apparatus is closed and ready to work. The manner in which each pneumatic key-operating device works will now be described. Each key or shift bar of the typewriter proper is provided with a similar pneumatic operating device so that the description of one will suffice for the description of all, and the invention will be understood when the manner of connecting the several operating devices is described. The key 13 on the exterior of the casing A, as before described, operates to shift the rod 14 (see Figs. 1 and 4) back and forth. Within the cylinder 15, there is a partition, shown in section, in which a passage 41 connects separate chambers 61 and 62 with the space above the piston 63. When the rod 14 is moved to the right (see Fig. 4), it will be seen that the space above the piston 63 within the cylinder is connected by means of passage 41 with chamber 61, and this chamber 61 is connected by means of the pipe 17 to the vacuum space u (of about twenty-nine inches of mercury) of the casing B to be hereinafter described. The cylinder 15 at its lower end has an opening connecting with the space having a degree of vacuum of about twenty inches of mercury within the interior of the chamber A. Because of the difference of pressure above and below piston 63 when the valve-disk 42 is in the position shown in Fig. 4, the key-operating rod 39 will be moved upwardly from its lowermost position. If the key 13 is operated to move rod 14 to the left (Fig. 4), the disk 42 will close the connection with the chamber 61, and the disk 43, by its movement to the left, will allow the passage 41 to communicate with the chamber 62 which is connected by means of pipe 16 to the atmosphere through the two-way valve 18 and the little air-screening box 19. In this case, the pressure on the upper side of the piston 63 will be one atmosphere, while the pressure on the other side will be a vacuum pressure of about twenty inches of mercury. This will cause a quick plunge of the rod 39 downwardly so that the button 40 on the end thereof will strike the corresponding key 12 of the typewriter to operate the latter. It will be noted from Figs. 1 and 4 that all the devices 15 have their chambers 62 and 61 connected to the common pipes 16 and 17, respectively, and in these common pipes 16 and 17 there are flexible connections shown which will allow the portion of the casing D to swing upon pivots 30, as above described, without breaking these connections. The pipe 16, as stated, connects through two-way valve 18 to atmosphere while pipe 17 connects to vacuum space $u$. If it is ever desired to operate the pneumatic devices at a time when the casing A is open to the atmosphere or when extra pressure is desired on keys 12, the two-way valve 18 (operable from outside of the cabinet) may be operated to connect the air-chamber 21, holding air under pressure, to the pipe 16, and thus, when the rod 14 is moved to the left, the air under pressure will operate to move the piston 63 downwardly whether atmospheric or vacuum pressure is on the underside of the piston 63. The piston 63 will, in this latter case, be returned to the upper position in the same manner as already described by connecting passage 41 with chamber 61 when rod 14 is moved to the right. By this or a similar arrangement, the keys of the typewriter may be operated by pneumatic or other power-operated devices. There are many advantages in thus operating the keys of the typewriter by power. The operator does not need to use the usual force in striking the keys, the action will be quicker, and the power operating each key being uniform the impression made by the type will be uniform. All of these facts result in a better product from the machine, and the operator does not tire as quickly as in operating the ordinary typewriter.

In order that a typewriter may be efficiently operated, it is desirable that the operator be able to see the writing as it takes place. For this purpose, the upper portion A' of the casing A is provided, as shown, with windows of glass or other transparent material. An electric light 72 or other means of illumination may be added, as shown in Fig. 1.

It is desired in this apparatus to provide a means for returning the carriage of the typewriter by pneumatic or other power-operated means. The mechanism to do this will now be described. The line space lever 29 of the carriage is connected to a flexible cord or wire 26 passing over pulleys 28 suitably mounted to guide this flexible connection 26. The other end of the flexible connection is fastened to an arm 25 connected to the piston rod in cylinder 24. The piston in this cylinder 24 is controlled by means of atmospheric pressure transmitted through the screen-box 19, through the two-way valve 18, the pipe 52, and the two-way valve 18'. It will be seen that, if the piston is in the position shown in Fig. 1 with a vacuum established in the interior space of the casing A, the atmospheric pressure entering the piston cylinder through the pipe 52 will cause the piston to be driven from its left-hand position shown to its right-hand position because of the difference in pressure on the two sides of the piston. Thus, the flexible connection 29 will be pulled over its guiding pulleys 28 in a manner to return the carriage of the typewriter in the way that the operator at present returns it by hand. At the same time, line space lever 29 will space the paper in the typewriter for the next line. Valve 18' is then operated to break the atmospheric connection with the piston cylinder along pipe 52 and connect it with pipe 23 and vacuum space in the interior of casing A so that the piston may return in the ordinary operation of the typewriter from the right-hand position to the left-hand position, as shown in Fig. 1, since the pressure on both sides of the piston is equal. A pivoted weight device 27 with a friction roll on the end thereof acts to keep the flexible connection 26 taut during its movements. If the interior space of the casing A, for any reason, is at atmospheric pressure and it is desired to return the carriage, the following operations are necessary. The compression chamber 21 containing air under pressure is connected through the two-way valve 18 to the pipe 52, and air under pressure from the chamber 21 will pass through pipe 22, valve 18, pipe 52, and valve 18' to force the piston from the left-hand position shown in Fig. 1 to its right-hand position, for there will be a difference of pressure on the opposite sides of the piston.

By the arrangement of apparatus and devices described, the typewriter keys may be operated, the paper spaced, and the carriage returned, all from without the casing while the typewriter itself is inclosed in the casing and its noise eliminated.

When the casing is closed and all parts in working order, a vacuum of about ten inches of mercury is maintained in the double-walled space, and a vacuum of about twenty inches of mercury is maintained in the interior of casing A. As the typewriter is operated, it will therefore be surrounded by two distinct vacuum spaces, and from the interior to the exterior of the casing A there is no medium capable of transmitting sound. The casing A is mounted on and supported by the cabinet $a$ through the medium of rubber pads or blocks. The typewriter then, by this apparatus, is surrounded, shielded, and supported in such a way that any noise made by the operating parts of the typewriter is eliminated before it can reach the outside of the casing A. The typewriter, therefore, may be operated from outside of the casing in a noiseless manner.

The apparatus for establishing and maintaining the desired vacuum spaces will now be described. The cabinet $a$ contains a double-walled casing B, supported therein by rubber pads, in the interior space of which is mounted a motor $s$ having a crank-shaft suitably supported from the inner wall and connected to the piston rods of three pumps, as shown. The two pumps $r$ are designed to serve as exhausting pumps in the vacuum establishing scheme while the pump $r'$ is designed to serve as a compression pump to supply the compressed air chamber 21. The double-walled space $u$ between the two walls of casing B is adapted to be maintained at a vacuum of about twenty-nine inches of mercury by means of the exhaust pumps $r$ in a manner to be described. It will be noted that the circuit of the motor $s$ is controlled by a switch $t$. This circuit may be connected in any manner to a suitable supply current. If the circuit of the motor is closed, the motor operates to drive the exhaust and compression pumps mentioned. The piston rods of these pumps are placed with an angular difference of 120° around the crank shaft of the motor $s$ for the purpose of balancing the load on the motor. The interior and exterior walls of the casing B are held apart by means of rubber blocks or other sound-deadening material which will not convey any sound from one wall to another. The noise of the motor is therefore eliminated. It will be noted on examining the exhaust pumps that the intake ports are both connected to the space $u$, and the exhaust ports are connected to the interior of the cabinet $a$ from which, as shown at the bottom, there is a screened opening to allow atmospheric conditions to be maintained within the cabinet $a$. As the pumps $r$ operate to exhaust the space $u$, it will be noted that by means of the outwardly-opening check-valve 1, the interior of the casing B will also be exhausted, and it is designed to exhaust these two spaces to approximately twenty-nine inches of mercury. The compression pump $r'$ operates to force air under pressure into the chamber 21 in connection with which there is an automatically-operating presure-controlling valve to maintain the desired pressure within the chamber. The space $u$, in which there is established a vacuum of about twenty-nine inches of mercury, is connected by means of a pipe $y$ to the double-walled space of the chamber A, and by means of the flexible connection 7 to the double-walled spaces of the portions A′ and D. There is in this pipe $y$ a valve $y'$ which is normally held open by means of a magnet 3 against a spring tending to close it. The magnet, in turn, is electrically controlled by a vacuum gage 2. This vacuum gage 2 is connected to the double-walled space of the chamber A, and the hand of the gage registers the degree of vacuum therein. As shown in the drawing, when the vacuum within that space is established above approximately ten inches of mercury, the circuit of the magnet 3 is broken which allows the spring-operated valve $y'$ to close. This results in a vacuum of ten inches of mercury being maintained in the double-walled space of the chamber A, for the valve $y'$ will shut off communication from this space with the space $u$ when that degree of vacuum has been established. The interior of the chamber A is connected by means of pipe $w$ to the space $u$, and in this pipe $w$ there is a two-way valve 8 which, when turned in one direction, connects the interior of the casing A with the atmosphere, and when turned in the other direction, connects the interior space of the casing A with the space $u$. There is also another valve $w'$ in this pipe $w$ which is normally closed by means of a spring, as shown. This valve is held open when the magnet 5 is energized. The magnet 5 is controlled by a vacuum gage 4, the hand of which registers the degree of vacuum in the interior space of the casing A, and this gage is arranged so that its hand will break the circuit of the magnet 5 when the degree of vacuum established in the interior of the casing A reaches approximately twenty inches of mercury. With this arrangement of the pipes $y$ and $w$, as described, it will be seen that, although a vacuum of twenty-nine inches of mercury is established in the space $u$, a vacuum of ten inches of mercury will be established in the double-wall spaces of the casing A and a vacuum of twenty inches of mercury in the interior space of the casing A. Where the space $u$ has suitable capacity or volume, it will be seen that if atmospheric pressure is established in casing A at any time and the apparatus has again been placed in condition for the vacuum to be established in the casing A, the vacuum within the chamber A will be almost immediately reëstablished because the degree of vacuum in the space $u$ is so much greater than the desired degree of vacuum in the casing A. This results in a drop in the degree of vacuum in the space $u$ but not in the interior of casing B because of the check-valve 1. The proper degree of vacuum in this space $u$ is soon reëstablished because the gage 6 connected to this space $u$ controls the circuit of the motor $s$, and this motor $s$ will operate the pumps $r$ to exhaust and establish vacuum condition in the space $u$ until the desired degree is reached.

It may be pointed out that the invention, broadly, may be carried out by applying devices for inclosing the typewriter and deadening its sound, such as a double-walled casing with sound-deadening packing material between the walls, or by using two or more walls without the packing material, or a single wall of sound-deadening material of sufficient thickness, or a single or multiple wall inclosing a space, or spaces in which a sufficient vacuum has been obtained. Where a typewriter is placed with exterior operable connections in a casing where a complete, or nearly complete, vacuum is possible and practicable, the casing can be constructed of a single wall of suitable material, form and thickness to resist the outside pressure of the atmosphere, and in such a vacuum the sound is completely eliminated.

Figure 5:
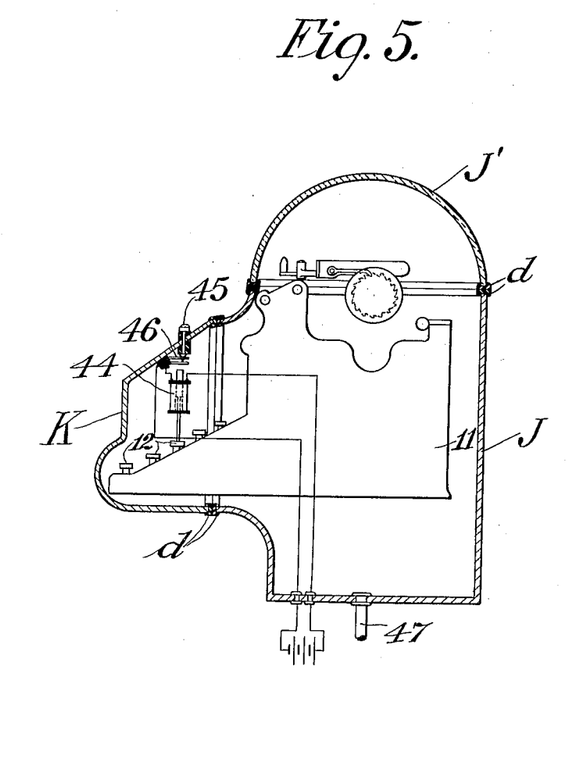
Fig. 5 is a sectional view of another modified form of casing in which it is planned to place the typewriter for operation.

Fig. 5 shows a single wall casing comprising portions J, J′, and K in which a nearly complete vacuum may be established to eliminate the noise of the typewriter, shown in outline. The pipe 47 connects the interior of the chamber with a vacuum-establishing apparatus similar to that already described. It is planned to maintain the vacuum within the casing at about twenty-nine inches of mercury. In this form of the invention access may be had to the typewriter by opening portions J′ and K in a similar manner to portions A′ and D, already described in connection with Fig. 1. It is not thought necessary to show the specific arrangement in detail in Fig. 5 for it is clearly disclosed in Fig. 1. The portions J′ and K have their edges abutting with portion J of rubber, as indicated, in order to make an effectual seal. In this modification, it is planned to operate the typewriter keys by electrical means, and as an illustration of how this may be done, a solenoid 44 is shown in position to operate on key 12. The other keys are operated in the same manner as the one shown. The solenoids have suitable circuits, as indicated, and a switch 46 for each one normally keeps the circuit open. A key 45, one for each key or shift bar of the typewriter, operates to close its corresponding switch. These keys each have a head connected to a plunger for closing the switch, and there is a flexible member immediately under the head to normally hold the plunger up. When a solenoid is energized, its corresponding typewriter key is operated in an obvious manner.

Figure 8:
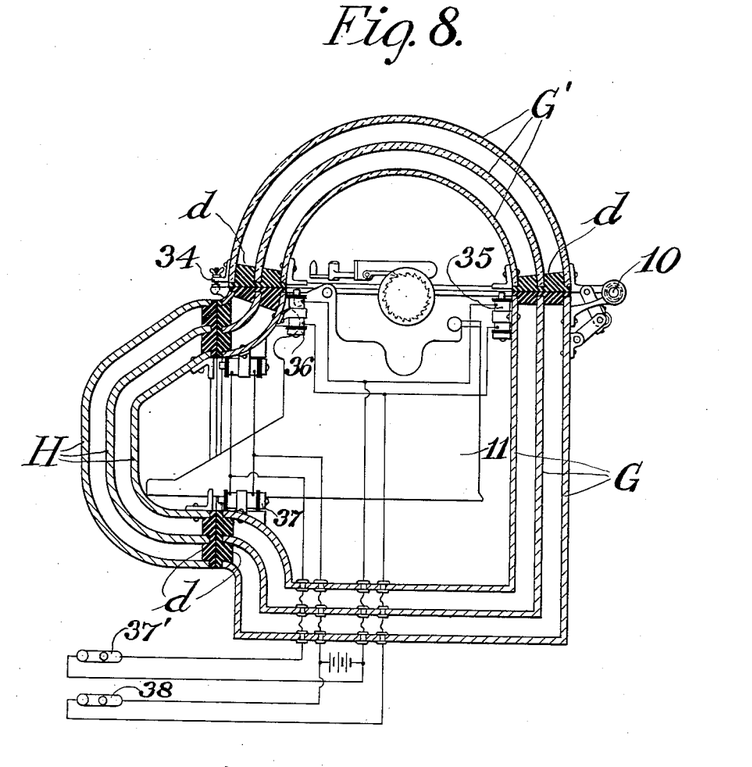
Fig. 8 is a sectional view of a modified form of casing.

In Fig. 8 a modified form of casing is shown in which the vacuum principle of eliminating noise is not used. The casing, in this instance, comprises portions G, G′, and H, each having three walls held together in spaced-apart relation by the molded rubber or other suitable non-sound-conducting material pieces $d$. Access to the interior of the casing is obtained by swinging either portions H or G′ into open position in a manner similar to that described in connection with the other forms of casings. In order to hold portions H and G in tightly-closed position, magnets 35, 36 and 37 are provided which are fastened to the interior walls of portion G and act, when energized, on armatures fastened to the interior walls of portions H and G′ to hold these walls closed. It is to be understood that the exterior wall of portion H has a latch-closing means similar to that described in connection with Fig. 2. The exterior wall of portion G′ has a suitable binding means 34 to hold it in closed position. With the walls fastened in the manner indicated, the rubber abutting pieces $d$ will be pressed into sealing position. If only the outer walls were provided with holding means, the rubber pieces $d$ would probably not be held together properly. The noise of the typewriter in the interior of the casing will be eliminated because of the multiple-walled surrounding spaces through which there is no sound transmitting material.

The typewriter keys in this modification may be operated from without the casing, preferably by electrical means similar to that shown in connection with Fig. 5. It is to be understood that the Fig. 8 is in an illustrative form which, together with the description, will enable one skilled in the art to make and use the invention, broadly, without the use of a vacuum.

Figure 6:
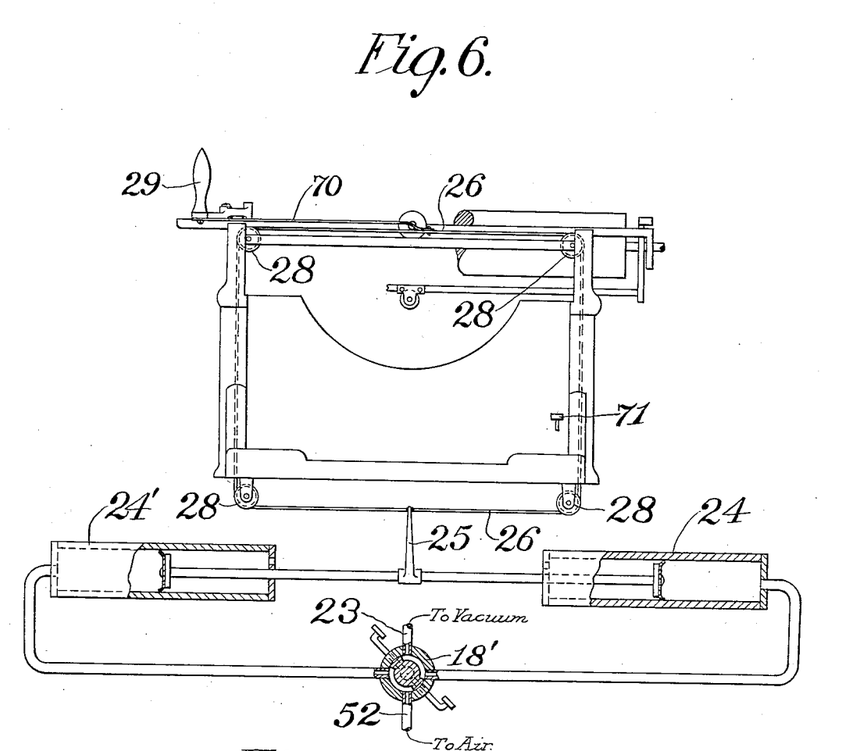
Fig. 6 is a modification showing the carriage return mechanism.
Figure 7:
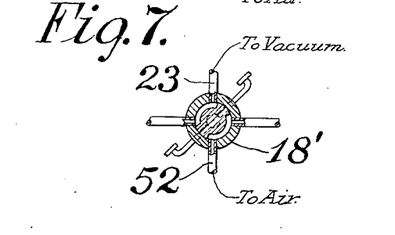
Fig. 7 is a detail view of a portion of Fig. 6.

Fig. 6 shows another method of operating the carriage of the typewriter. By this method the carriage is moved in either direction, the ordinary "return" spring of the carriage being disconnected. The spacing lever 29 is connected by a rigid connection 70 with a cord 26, and this connection is pivoted at its junction with both lever and cord. The cord 26 passes over pulleys 28 and is connected with the arm of a double piston rod 25. At each end of the rod is a piston oppositely mounted in cylinders 24 and 24′. These cylinders are connected by a pipe at opposite ends with a two-way valve 18' connected at inlet 52 with the atmosphere or compressed air and at outlet 23 with a vacuum. In the position of valve 18' shown in Fig. 6, air will enter at 52 and force the piston of 24' to the right as soon as vacuum is established through outlet 23 at the right-hand side of the piston in cylinder 24, thus moving the carriage to the left or in the direction in which it is ordinarily drawn by the usual spring. In the position of the valve 18' shown in Fig. 6, the reverse motion will take place and the carriage be "returned." By having the spring of the spacing lever 29 of sufficient stiffness, it is obvious that by manipulating the valve 18' the carriage can be moved in either direction without "spacing," the "spacing" taking place, when desired, at the end of the "return" movement of the carriage, when the latter is stopped by the means usually provided because of the force imparted by the piston rod, which is intended to be greater than the resistance of the spring to lever 29. The usual "tabulating" key 71 of the typewriter can be operated to allow the carriage free movement in either direction.

While specified degrees of vacuum in the various spaces of the apparatus are given, applicant does not desire to limit his invention to the use of the specified degrees given. Other degrees of vacuum may be used in the various spaces without interfering with the efficiency of the apparatus.

The following features of the invention are to be noted as of value and shown in the drawings: All connections between the walls of casings A and B are sound-insulated by means of sleeves of rubber or other sound-deadening material. All entrances for air are screened, preferably with fine-meshed cloth or wire so that dirt cannot pass into the working parts of the apparatus. As soon as vacuum is established in the interior chamber of casing B, the vacuum is also established on the upper side of the pumps on account of the holes in the upper ends of said pumps and thus acts as a suction to hold the upper bearings of the piston rods always against the driving shaft, doing away with the noise of a worn bearing alternately pulling and pushing a reciprocating body. It should also be noted that the use of a vacuum through pipe 17, chamber 61, and passage 41 (see Fig. 4) greater than that in the interior chamber of casing A, always tends to hold the pistons of the pneumatic key-operating devices in the uppermost position, thus permitting the free passage of said devices over the keys of the typewriter when section D of casing A is opened or shut.

The preferred form of the invention is that shown in Fig. 1. Whatever the theory or scientific facts may be which give the desired results, the apparatus described in connection with Fig. 1 has been found by experiment to be efficient in giving such results. Applicant does not, therefore, desire to give a positive scientific explanation of every necessary condition to obtain the results, but has instead given a full and clear description of a preferred arrangement which has given the results regardless of the scientific explanation.

What I claim is:

1. In an apparatus of the class described and in combination, a sound deadening casing adapted to inclose a typewriter, a typewriter therein, and power driven devices independent of the typewriter and within the casing to actuate the typebars, the space bar, and the carriage, and means to control said power driven devices from without the casing.

2. A silent typewriting mechanism comprising in combination a multiple walled sound deadening casing adapted to inclose a typewriter, a typewriter therein, and power driven devices independent of the typewriter and within the casing to actuate the type-bars, the letter spacing mechanism, and the carriage, and means to control said power driven devices from without the casing.

3. In an apparatus of the class described, a multiple-walled sound-deadening casing, each wall being connected with the adjacent wall solely by means of a sound-insulating connection along which sound cannot effectively pass, a typewriter arranged therein, and means to selectively actuate the type-bars of the typewriter from without the casing.

4. In an apparatus of the class described, a sound-deadening casing adapted to inclose a typewriter, said casing consisting of a stationary portion, a portion movable to allow access to the carriage of the typewriter, and a portion movable to allow access to the keys of the typewriter, a typewriter, and means to selectively actuate the type-bars of the typewriter from without the casing.

5. In an apparatus of the class described, a sound deadening casing adapted to inclose a typewriter, a typewriter therein, power driven devices independent of the typewriter within the casing to actuate the type bars, and the letter spacing mechanism, and means to control the movement of the carriage of the typewriter in either direction from without the casing.

6. In an apparatus of the class described, a sound deadening casing adapted to inclose a typewriter, a typewriter therein, and exhausting means, and power driven means within the casing to actuate the type bars, the letter spacing mechanism, and the carriage from without the casing.

7. In an apparatus of the class described, a sound-deadening casing adapted to inclose a typewriter, a typewriter therein, means to actuate the typebars of the typewriter from without the casing, means to establish a vacuum within the casing, all constructed and arranged so that the noise of the typewriter and that of the establishing means is substantially eliminated in the immediate vicinity of the outside of said casing.

8. In an apparatus of the class described, a multiple-walled sound-deadening casing adapted to inclose a typewriter, a typewriter therein, and means for establishing a vacuum between the exterior and interior walls of the casing and in the interior chamber of the said casing.

9. In an apparatus of the class described, a multiple-walled sound-deadening casing adapted to contain a typewriter, a typewriter therein, means for establishing a vacuum within the casing comprising means for establishing different degrees of vacuum between the exterior and interior walls of said casing from the degree of vacuum established within the interior chamber of said casing.

10. In an apparatus of the class described, a sound-deadening casing adapted to inclose a typewriter, a typewriter therein, an exhausting means to establish a vacuum within the casing, and controlling devices operable to call said exhausting means into operation whenever the pressure within the casing exceeds a predetermined value, and further to render inoperative said exhausting means when the pressure within the casing has reached a predetermined minimum limit.

11. A silent typewriting mechanism, comprising, in combination, a typewriter, means to removably contain the typewriter, said last-named means being carried in a casing, means operable from without the casing to selectively operate the mechanisms of the typewriter, said casing comprising a plurality of compartments which comprise, in turn, a plurality of contiguous but insulated bounding walls, and adapted one thereof to contain the typewriter and another to contain power operated devices.

12. A multiple walled sound deadening casing adapted to inclose a typewriter and having an opening to permit access to the carriage of the typewriter, the multiple walls at said opening having one or more layers of yielding material between and across the edges thereof.

13. A multiple walled sound deadening casing adapted to inclose a typewriter and having an opening to permit access to the carriage of the typewriter, the multiple walls at said opening having a layer or layers of yielding material between and across the edges thereof, and means to press the edges of said walls against said yielding material.

FRANK B. POWERS.

Witnesses:
 SEBASTIAN HUSTON,
 MINNIE A. HUNTER.